(12) United States Patent
Sugizaki

(10) Patent No.: US 7,673,104 B2
(45) Date of Patent: Mar. 2, 2010

(54) INFORMATION PROCESSING APPARATUS, SYSTEM CONTROLLER, LOCAL SNOOP CONTROL METHOD, AND LOCAL SNOOP CONTROL PROGRAM RECORDED COMPUTER-READABLE RECORDING MEDIUM

(75) Inventor: Go Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 11/022,986

(22) Filed: Dec. 28, 2004

(65) Prior Publication Data

US 2006/0047918 A1 Mar. 2, 2006

(30) Foreign Application Priority Data

Aug. 31, 2004 (JP) ............................. 2004-252814

(51) Int. Cl.
*G06F 12/00* (2006.01)
*G06F 13/00* (2006.01)
*G06F 13/28* (2006.01)

(52) U.S. Cl. ..................................... 711/146; 710/107
(58) Field of Classification Search ........................ None
See application file for complete search history.

(56) References Cited

U.S. PATENT DOCUMENTS

| 5,404,489 | A | * | 4/1995 | Woods et al. ............... 711/152 |
| 5,862,357 | A | | 1/1999 | Hagersten et al. |
| 5,890,217 | A | | 3/1999 | Kabemoto et al. |
| 6,011,791 | A | * | 1/2000 | Okada et al. ................ 370/352 |
| 6,516,391 | B1 | * | 2/2003 | Tsushima et al. ........... 711/146 |
| 6,519,665 | B1 | * | 2/2003 | Arimilli et al. .............. 710/110 |
| 2006/0090041 | A1 | * | 4/2006 | Nakagawa ................... 711/146 |

FOREIGN PATENT DOCUMENTS

| JP | 5-2534 | 1/1993 |
| JP | 6-187239 | 7/1994 |
| JP | 6-250926 | 9/1994 |
| JP | 11-259361 | 9/1999 |

OTHER PUBLICATIONS

Handy, Jim, the Cache Memory book,1998, Academic Press, 2nd Edition, pp. 157 and 161-162.*
European Search Report issued on Feb. 19, 2009 in corresponding European Patent Application 05250188.9.

* cited by examiner

*Primary Examiner*—Christian P Chace
*Assistant Examiner*—Gary W Cygiel

(57) ABSTRACT

The present invention relates to an information processing apparatus equipped with a plurality of storage units and a plurality of system controllers sharing communication control on the plurality of storage units. For shortening the processing time needed for a memory access request, each of the plurality of system controllers includes a local snoop control unit for, when receiving the memory access request, retrieving target data on the memory access request from the storage unit, this system controller takes charge of, in parallel with transmission/reception processing on a retrieval instruction in a broadcast transmitting/receiving unit or processing in a global snoop control unit and a memory access control unit for fulfilling the memory access request when the target data is retrieved by the local snoop control unit and a predetermined condition reaches satisfaction.

20 Claims, 8 Drawing Sheets

INFORMATION PROCESSING APPARATUS, SYSTEM CONTROLLER, LOCAL SNOOP CONTROL METHOD, AND LOCAL SNOOP CONTROL PROGRAM RECORDED COMPUTER-READABLE RECORDING MEDIUM

BACKGROUND OF THE INVENTION

1) Field of the Invention

The present invention relates to, for a large-scale information processing apparatus including at least a plurality of storage units and a plurality of system controllers sharing communication control with respect to the plurality of storage units, a technique of fulfilling a memory access request with respect to the plurality of storage units.

2) Description of the Related Art

In general, a large-scale information processing apparatus equipped with a plurality of CPUs (Central Processing Units), I/O (Input/Output) units and other units is provided with a plurality of system controllers comprising, for example, LSI (Large Scale Integration) for controlling the communications between memory access requests, issued from these CPUs, I/O units and others, and storage units mounted in the CPUs.

FIG. 6 is a block diagram showing a configuration of a conventional large-scale information processing apparatus 100. As shown in FIG. 6, the conventional large-scale information processing apparatus 100 is equipped with system boards A and B, and the system board A has CPUs 10, 11 and I/O units 20, 21 while the system board B has CPUs 12, 13 and I/O units 22, 23.

Each of the CPUs 10 to 13 includes a plurality of cache memory hierarchized (in this case, two layers). That is, a primary cache memory 10a and a secondary cache memory 10b are included in the CPU 10, a primary cache memory 11a and a secondary cache memory 11b in the CPU 11, a primary cache memory 12a and a secondary cache memory 12b in the CPU 12, and a primary cache memory 13a and a secondary cache memory 13b in the CPU 13.

In addition, the system board A is equipped with main memories 30 and 31, and the system board B is equipped with main memories 32 and 33.

Still additionally, the system board A has a system controller 40-1 designed to carry out the communication control with respect to the storage units (in this case, the primary cache memories 10a, 11a, the secondary cache memories 10b, 11b, and the main memories 30, 31) mounted on the system board A.

The system board B has a system controller 40-2 designed to carry out the communication control with respect to the storage units (in this case, the primary cache memories 12a, 13a, the secondary cache memories 12b, 13b, and the main memories 32, 33) mounted on the system board B.

Thus, the system controllers 40-1 and 40-2 share or bear the communication control relative to the plurality of storage units provided in the information processing unit 100 and similar in configuration to each other except the storage units which are an object of communication control. These system controllers 40-1 and 40-2 are connected to be communicable with each other.

The system controller 40-1 is made up of a memory access request receiving unit 41-1, a retrieval unit 42-1, a broadcast transmitting/receiving unit 43-1, a global snoop control unit 44-1 and a memory access control unit 45-1.

The memory access request receiving unit 41-1 is made to receive a memory access request issued from one of the CPUs 10, 11 and the I/O units 20, 21.

The retrieval unit 42-1 is for, in response to an issue of a memory access request, retrieving the data to be accessed (which will hereinafter be referred to simply as target data) on this memory access request from the storage units the system controller 40-1 takes charge of (assigned thereto), in this case, from the primary cache memories 10a, 11a, the secondary cache memories 10b, 11b and the main memories 30, 31.

The broadcast transmitting/receiving unit 43-1 is for, when an issue of a memory access request takes place, transmitting/receiving a retrieval instruction (retrieval request) for the retrieval of the target data on (related to) the memory access request to/from the other system controller 40-2, thus retrieving the target data on the memory access request from all the storage units provided in the information processing apparatus 100. That is, the broadcast transmitting/receiving unit 43-1 broadcasts a retrieval instruction (indication) to the other system controller 40-2 when the memory access request receiving unit 41-1 receives a memory access request, and receives a retrieval instruction when the retrieval instruction is broadcasted from the other system controller 40-2.

In accordance with the retrieval instruction transmitted/received by the broadcast transmitting/receiving unit 43-1, the global snoop control unit 44-1 makes the retrieval unit 42-1 retrieve the target data on the memory access request from the assigned storage units (in this case, the primary cache memories 10a, 11a, the secondary cache memories 10b, 11b, and the main memories 30, 31) and, through the communications of retrieval results with respect to the other system controller 40-2, determines an operation for the memory access request on the basis of the retrieval result in the other system controller 40-2 and its own retrieval result.

The memory access control unit 45-1 is for fulfilling the memory access request on the basis of the operation to the memory access request determined in the global snoop control unit 44-1.

The memory access request receiving unit 41-2, the retrieval unit 42-2, the broadcast transmitting/receiving unit 43-2, the global snoop control unit 44-2 and the memory access control unit 45-2 provided in the system controller 40-2 are similar to the memory access request receiving unit 41-1, the retrieval unit 42-1, the broadcast transmitting/receiving unit 43-1, the global snoop control unit 44-1 and the memory access control unit 45-1 in the system controller 40-1, respectively, except that the objects of communication control are the primary cache memories 12a, 13a, the secondary cache memories 12b, 13b and the main memories 32, 33.

FIG. 7 is a time chart for explaining an operation of the conventional large-scale information processing apparatus 100. As shown in FIG. 7, when a memory access request (in this case, a data fetch request; hereinafter referred to as a fetch request) is issued from the CPU 10 (see t1) and the memory access request receiving unit 41-1 of the system controller 40-1 receives the fetch request issued from the CPU 10 (see t2), the broadcast transmitting/receiving unit 43-1 broadcasts a retrieval instruction for the target data on the fetch request to the other system controller 40-2 for retrieving the target data on the fetch request from all the storage units (see t3).

Following this, when the broadcast of the retrieval instruction by the broadcast transmitting/receiving unit 43-1 reaches completion, the global snoop control units 44-1 and 44-2 make the retrieval units 42-1 and 42-2 carry out the retrieval (snoop) on the basis of the transmitted/received retrieval instruction in a synchronized condition (see t4).

Subsequently, when the retrievals by the retrieval units 42-1 and 42-2 reach completion, the global snoop control units 44-1 and 44-2 communicate the retrieval results to each other in a synchronized condition (see t5) and makes a decision on a final operation for the fetch request in accordance with the retrieval results and determine it (see t6).

At this time, in a case in which retrieval unit 42-1 retrieves the target data on the fetch request from the primary cache memory 11a or the secondary cache memory 11b (in this case, the primary cache memory 11a) of the CPU 11 and the global snoop control units 44-1 and 44-2 determine the readout of the target data from the primary cache memory 11a with respect to the fetch request, the memory access control unit 45-1 issues a readout (read) request for the target data on the fetch request to the primary cache memory 11a of the CPU 11 (see t7) to read out the target data on the fetch request from the primary cache memory 11a into the system controller 40-1 (see t8 and t9), and the memory access control unit 45-1 then transmits the target data, read out from the primary cache memory 11a, as a fetch data response to the CPU 10 (see t10 and t11). Thus, the implementation of the fetch request reaches completion.

As described above, in the conventional large-scale information processing apparatus 100, with respect to a memory access request issued, communications are made among the plurality of system controllers 40-1 and 40-2 to make a decision and determination on the processing for this memory access request. At this time, the broadcast processing (see t3 in FIG. 7) and the retrieval result communication processing (see t5 in FIG. 7) to be conducted between the system controllers 40-1 and 40-2 take time and, hence, the conventional large-scale information processing apparatus 100 requires a long time from when a memory access request occurs until this memory access request is fulfilled.

That is, in the conventional large-scale information processing apparatus 100, of the time to be taken for the entire processing to a memory access request, the time to be needed for the broadcast processing and the retrieval result communication processing for the retrieval of the target data on the memory access request absorbs a large percentage.

For this reason, for shortening the time to be needed for the processing on a memory access request, in the information processing apparatus 100, in a case in which the operation on the memory access request can be determined on the basis of only the retrieval result in the retrieval unit 42-1, the global snoop control unit 44-1 is made so as to determine and carry out the operation on the memory access request without making a communication between the plurality of global snoop control units 44-1 and 44-2.

FIG. 8 is a time chart in a case in which, in the conventional large-scale information processing apparatus 100, of the processing for the memory access request, the communication processing on the retrieval result is not conducted between the plurality of system controller 40-1 and 40-2.

That is, as shown in FIG. 8, when the memory access request receiving unit 41-1 of the system controller 40-1 receives a memory access request (see t1 and t2), after the broadcast transmitting/receiving unit 43-1 transmits/receives a retrieval instruction (see t3), if, as the result of the retrieval (snoop) of the target data on the memory access request in the retrieval unit 42-1 (see t4), the retrieval unit 42-1 retrieves the target data from the assigned storage units and the type of the memory access request, the registration state of the target data and others satisfy a predetermined condition, the global snoop control unit 44-1 determines and carries out an operation on the memory access request without making a communication on the retrieval result with respect to the other global snoop control unit 44-1 (see t7 to t11).

A description will be given hereinbelow of a case (the aforesaid predetermined condition) in which the global snoop control unit 44-1 can determine an operation for a memory access request on the basis of only a retrieval result in the retrieval unit 42-1. In the conventional information processing apparatus 100, there are the following cases (1) to (3) as the cases in which the global snoop control unit 44-1 can determine an operation for a memory access request on the basis of only the retrieval result in the retrieval unit 42-1.

(1) A case in which, like an example shown in FIG. 8, an issued memory access request is a fetch request and this fetch request is a sharing type fetch request for only fetching target data from one of the plurality of storage units and the retrieval unit 42-1 retrieves the target data from the assigned storage units.

(2) A case in which a fetch request serving as a memory access request is an exclusive fetch instruction whereby the target data is retained in only one storage unit of a plurality of storage units (in this case, the primary cache memories 10a to 13a, the secondary cache memories 10b to 13b and the main memories 30 to 33) and the target data is retrieved from the storage unit, the retrieval unit 42-1 takes charge of, and the retrieved target data is exclusive data which is retained in only one storage unit but not retained in the other storage units.

(3) A case in which an issued memory access request is a store instruction and the target data is retrieved from the storage unit, the retrieval unit 42-1 takes charge of, and the retrieved target data is exclusive data.

Thus, in the conventional large-scale information processing apparatus 100, the communication processing on the retrieval result between the global snoop control units 44-1 and 44-2 is omissible only in the above-mentioned cases (1) to (3).

Incidentally, as the technique for retaining data in an exclusive manner, there has been known a technique (see Japanese Patent Laid-Open Nos. HEI 6-250926 and HEI 11-259361) of making registration so that, in a CPU having a plurality of cache memories arranged hierarchically, data is retained in only one cache memory.

In addition, there has been proposed a technique of, in a case in which a plurality of cache memories arranged hierarchically share and retain data, maintaining the consistency (agreement) of the data shared in the respectively memories (see Japanese Patent Laid-Open Nos. HEI 5-2534 and HEI 6-187239).

Meanwhile, in the above-described conventional large-scale information processing apparatus 100, of the communication processing to be conducted between the system controllers 40-1 and 40-2, the time (see t3 in FIG. 7) needed for the transmission/reception of a retrieval instruction between the broadcast transmitting/receiving units 43-1 and 43-2 is approximately equal to the time (see t5 in FIG. 7) needed for the communication processing on a retrieval result between the global snoop control units 44-1 and 44-2.

However, in the conventional large-scale information processing apparatus 100, although, in the case of the above-mentioned (1) to (3), the communication processing on the retrieval result between the global snoop control units 44-1 and 44-2 is omissible, the transmission/reception processing on a retrieval instruction to be conducted between the broadcast transmitting/receiving units 43-1 and 43-2 is not omissible in any case and, hence, much time is still required from when a memory access request occurs until the fulfillment of this memory access request.

Moreover, although the description has been given above of the example shown in FIG. 6 where the information processing apparatus 100 is equipped with two system controllers (system controllers 40-1 and 40-2), if the information processing apparatus 100 has a larger-scale arrangement including more-than-two system controllers, there is a need to mount the system controllers in a state of crossing a plurality of bodies of equipment, or to newly use an LSI for the communication control between the system controllers. This further increase the time to be taken for the communication processing between the system controllers and requires longer time from when a memory access request occurs until the fulfillment of that memory access request.

SUMMARY OF THE INVENTION

The present invention has been developed with a view to eliminating these problems, and it is therefore an object of the invention to, in an information processing apparatus equipped with a plurality of storage units and a plurality of system controllers which share communication control on these storage units, shorten the processing time to be taken for a memory access request to the plurality of storage units.

For this purpose, in accordance with an aspect of the present invention, there is provided an information processing apparatus comprising a plurality of storage units and a plurality of system controllers connected to each other to be communicable with each other and made to share communication control on the plurality of storage units, each of the plurality of system controllers including a broadcast transmitting/receiving unit for, when a memory access request occurs, making transmission/reception of a retrieval instruction for retrieval of target data on the memory access request between the plurality of system controllers to retrieve the target data on the memory access request from all the plurality of storage units, a global snoop control unit for retrieving the target data on the memory access request from the storage unit, this system controller takes charge of, in accordance with the retrieval instruction transmitted/received by the broadcast transmitting/receiving unit to make a communication on a result of the retrieval between the plurality of system controllers, a local snoop control unit for, when this system controller receives the memory access request, retrieving the target data on the memory access request from the storage unit, this system controller takes charge of, in parallel with the transmission/reception processing on the retrieval instruction in the broadcast transmitting/receiving unit or the processing in the global snoop control unit, and a memory access control unit for fulfilling the memory access request when the target data on the memory access request is retrieved from the storage unit, this system controller takes charge of, by the local snoop control unit and a predetermined condition reaches satisfaction.

In addition, preferably, each of the plurality of system controllers includes a first canceling unit for, in a case in which the memory access control unit fulfills the memory access request, if the broadcast transmitting/receiving unit does not carry out the transmission/reception of the retrieval instruction yet, canceling the transmission/reception processing on the retrieval instruction in the broadcast transmitting/receiving unit.

Still additionally, preferably, each of the plurality of system controllers includes a second canceling unit for, in a case in which the memory access control unit fulfills the memory access request, if the broadcast transmitting/receiving unit carries out the transmission/reception of the retrieval instruction, canceling the processing in the global snoop control unit.

Yet additionally, preferably, the plurality of system controllers have, as one of the plurality of storage units, a shared storage unit made to retain data exclusively with respect to the other storage units, and the predetermined condition signifies that the storage unit which retains the target data retrieved by the local snoop control unit is the shared storage unit.

Furthermore, for achieving the aforesaid purpose, in accordance with a further aspect of the present invention, there is provided a local snoop control method for use in an information processing apparatus including a plurality of storage units and a plurality of system controllers connected to each other to be communicable and made to share communication control on the plurality of storage units, each of the plurality of system controllers being made to conduct global snoop processing in which, when a memory access request occurs, for retrieving target data on the memory access request from all the plurality of storage units, transmission/reception of a retrieval instruction for the retrieval of the target data on the memory access request is made between the plurality of system controllers so that the target data on the memory access request is retrieved from the storage unit, this system controller takes charge of, in accordance with the transmitted/received retrieval instruction to communicate a result of the retrieval mutually between the plurality of system controllers, the local snoop control method comprising a local snoop step of, when said system controller receives the memory access request, retrieving the target data on the memory access request from the storage unit, this system controller takes charge of, in parallel with the retrieval instruction transmission/reception or the global snoop processing, and a memory access request fulfillment step of fulfilling the memory access request when the target data on the memory access request is retrieved from the storage unit, this system controller takes charge of, in the local snoop step and a predetermined condition reaches satisfaction.

Thus, according to the present invention, the local snoop control unit retrieves target data on a memory access request from an assigned storage unit(s) (storage unit the system controller takes charge of) in parallel with transmission/reception processing on a retrieval instruction by the broadcast transmitting/receiving unit and the processing in the global snoop control unit (local snoop step) and the memory access fulfillment unit fulfills the memory access when, as the retrieval result, the target data on the memory access request is retrieved from the assigned storage unit and a predetermined condition reaches realization (memory access request fulfillment step). Therefore, the memory access request can be fulfilled irrespective of the processing in the broadcast transmitting/receiving unit and the global snoop control unit, which considerably shortens the time to be taken from the memory access request occurs until the fulfillment of the memory access request.

In addition, the first canceling unit cancels the transmission/reception processing on a retrieval instruction in the broadcast transmitting/receiving unit when the memory access control unit fulfills the memory access request, thereby suppressing the execution of the processing unnecessary in this case, and the cancellation of the transmission/reception processing on the retrieval instruction in the broadcast transmitting/receiving unit reduces the communication load between the system controllers.

Still additionally, when the memory access control unit fulfills the memory access request, the second canceling unit the processing in the global snoop control unit, thereby suppressing the execution of the processing unnecessary in this case, and the cancellation of the processing in the global snoop control unit reduces the communication load between the system controllers.

Yet additionally, owing to the employment of the shared storage unit, the memory access control unit can fulfills the memory access request irrespective of the type of the memory access request when the target data on the memory access request is preserved in the shared storage unit, thus increasing the chance of processing the memory access request at a high speed without conducting the processing in the broadcast transmitting/receiving unit and the global snoop control unit, and reliably shortening the time to be taken until the fulfillment of the memory access request after the occurrence thereof.

DESCRIPTION OF THE PREFERRED EMBODIMENTS

Embodiments of the present invention will be described hereinbelow with reference to the drawings.

[1] First Embodiment of the Present Invention

Figure 1:
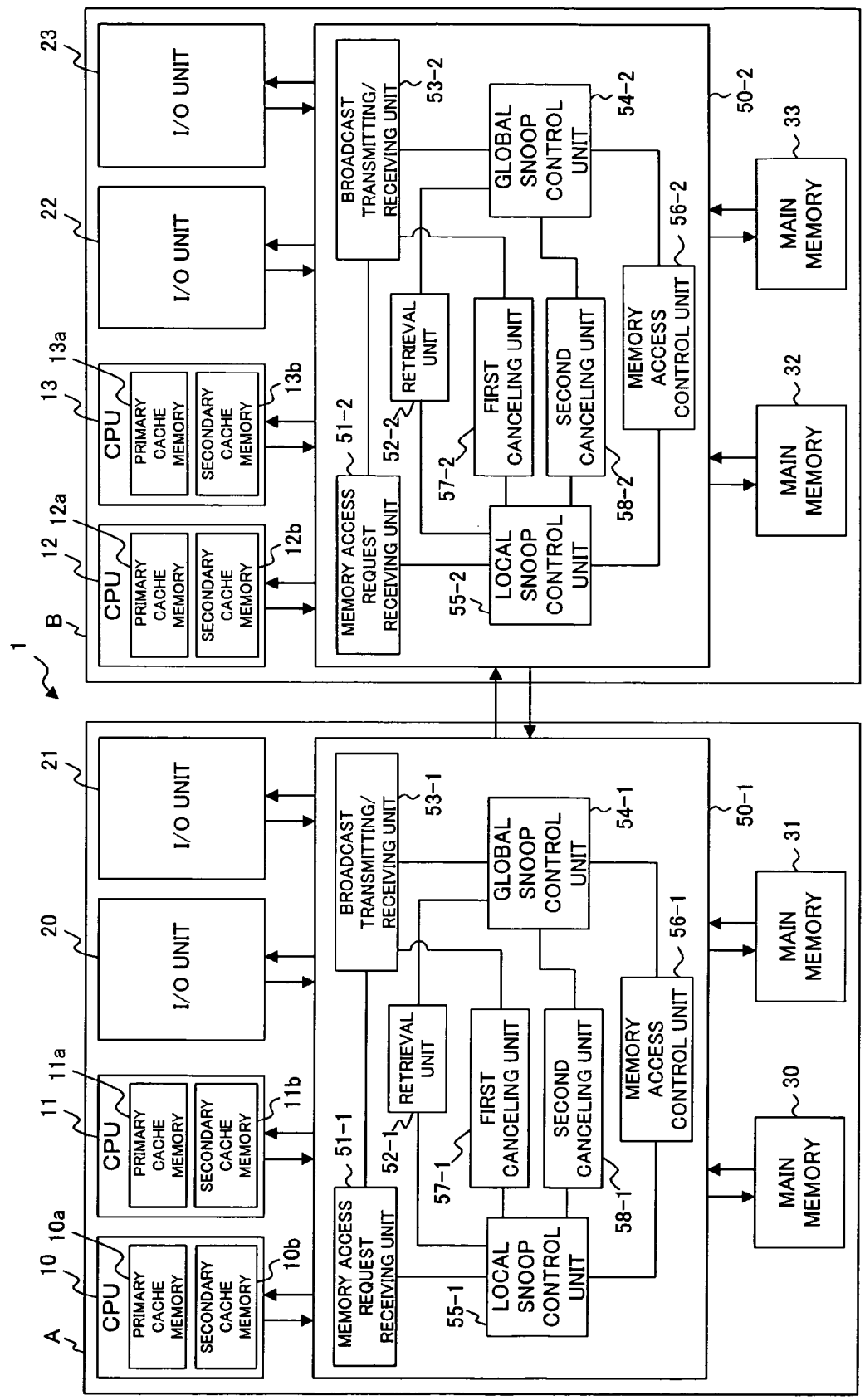
FIG. 1 is a block diagram showing a configuration of an information processing apparatus according to a first embodiment of the present invention.

First of all, a description will be given hereinbelow of an information processing apparatus and a local snoop control method according to a first embodiment of the present invention. FIG. 1 is a block diagram showing a configuration of an information processing apparatus 1 according to the first embodiment of the present invention. In FIG. 1, the same reference numerals as those used above designate the same parts or almost same parts.

As FIG. 1 shows, the information processing apparatus 1 according to the first embodiment of the present invention is made up of CPUs (Central Processing Units; arithmetic units) 10, 11, 12 and 13, I/O (Input/Output) units 20, 21, 22 and 23, main memories 30, 31, 32 and 33, and system controllers 50-1 and 50-2.

Each of the CPUs 10 to 13 is equipped with a plurality of cache memories arrange hierarchically (in this case, two layers). The CPU 10 is equipped with a primary cache memory 10a and a secondary cache memory 10b, the CPU 11 with a primary cache memory 11a and a secondary cache memory 11b, the CPU 12 with a primary cache memory 12a and a secondary cache memory 12b, and the CPU 13 with a primary cache memory 13a and a secondary cache memory 13b.

The system controllers 50-1 and 50-2 are connected through, for example, a bus to communicable with each other and are made to share communication control on the plurality of storage units (in this case, the primary cache memories 10a to 13a, the secondary cache memories 10b to 13b, the main memories 30 to 33) and the plurality of I/O units 20 to 23 provided in the information processing apparatus 1.

That is, the system controller 50-1 takes charge of the communication control on the CPUs 10, 11, the I/O units 20, 21 and the main memories 30, 31, while the system controller 50-2 takes charge of the communication control on the CPUs 12, 13, the I/O units 22, 23 and the main memories 32, 33.

Moreover, the system controller 50-1 is composed of a memory access request receiving unit 51-1, a retrieval unit 52-1, a broadcast transmitting/receiving unit 53-1, a global snoop control unit 54-1, a local snoop control unit 55-1, a memory access control unit 56-1, a first canceling unit 57-1 and a second canceling unit 58-1.

The memory access request receiving unit 51-1 is made to, when a memory access request is issued from one of the CPUs 10, 11 and the I/O units 20, 21, it (that is, the system controller 50-1) takes charge of, receive the issued memory access request.

The retrieval unit 52-1 is for, in the case of the issue of the memory access request, retrieving target data on the issued memory access request from the assigned storage units (storage units the system controller takes charge of) (in this case, the primary cache memories 10a, 11a, the secondary cache memories 10b, 11b, and the main memories 30, 31), and is designed to carry out the retrieval under control of the global snoop control unit 54-1, which will be mentioned later, and the local snoop control unit 55-1, mentioned later.

The broadcast transmitting/receiving unit 53-1 is for, when a memory access request is issued, making the transmission/reception of a retrieval instruction (retrieval request) for the retrieval of target data on a memory access request among all the system controllers (in this case, the system controllers 50-1 and 50-2) provided in the information processing apparatus 1, thus retrieving the target data on the issued memory access request from all the storage units (in this case, the primary cache memories 10a to 13a, the secondary cache memories 10b to 13b, and the main memories 30 to 33) provided in the information processing apparatus 1.

When a memory access request is issued from one of the assigned CPUs 10, 11 and the I/O units 20, 21 and the issued memory access request is received by the memory access request receiving unit 51-1, the broadcast transmitting/receiving unit 53-1 transmits (broadcasts) that retrieval instruction to a broadcast transmitting/receiving unit 53-2, mentioned later, of the other system controller 50-2 and, when a memory access request is received by a memory access request receiving unit 51-2, mentioned later, of the other system controller 50-2, it receives a retrieval instruction transmitted from the broadcast transmitting/receiving unit 53-2 to be mentioned later.

The global snoop control unit 54-1 makes the retrieval unit 52-1 retrieve the target data on the memory access request from the storage units, it takes charge of, in accordance with the retrieval instruction transmitted/received by the broadcast transmitting/receiving unit 53-1, with the all the results of this retrieval being mutually communicated with respect to a global snoop control unit (in this case, a global snoop control unit 54-2, mentioned later, of the system controller 50-2).

Moreover, the global snoop control unit 54-1 determines an operation to the memory access request on the basis of the retrieval results in all the system controllers 50-1 and 50-2.

Still moreover, the global snoop control unit 54-1 makes the retrieval unit 52-1 carry out the retrieval in synchronization with all the other global snoop control units 50-2 and performs the mutual communications of the retrieval results in synchronization with all the other global snoop control units 50-2.

When a memory access request is issued from one of the assigned CPUs 10, 11 and the I/O units 20, 21 and this memory access request is received by the memory access request receiving unit 51-1, the local snoop control unit 55-1 makes the retrieval unit 52-1 retrieve the target data on the memory access request from the assigned storage units in parallel with the transmission/reception processing on a retrieval instruction in the broadcast transmitting/receiving unit 53-1 or the processing in the global snoop control unit 54-1 (that is, regardless of the processing status in these broadcast transmitting/receiving unit 53-1 and the local snoop control unit 54-1).

In addition, on the basis of the retrieval results in the retrieval unit 52-1, the local snoop control unit 55-1 makes a decision as to whether or not to determine an operation to the memory access request. That is, when, as the result of the retrieval by the retrieval unit 52-1, the target data on the memory access request is retrieved from the assigned storage units and a predetermined condition(s) related to the type of the memory access request and the registration state of the target data reaches satisfaction, the local snoop control unit 55-1 determines an operation for the memory access request, with the processing for the memory access request being implemented by a memory access control unit 56-1 which will be mentioned later.

The determination of the operation for the memory access request by the local snoop control unit 55-1 (the aforesaid predetermined condition) is made in the following cases (a) to (c).

(a) A case in which a memory access request is a shared type fetch request for merely fetching target data from a plurality of storage units provided in the information processing apparatus 1 and the target data is retrieved from the assigned storage unit by the retrieval unit 52-1.

(b) A case in which a memory access request is an exclusive fetch instruction for fetching target data from one storage unit of a plurality of storage units provided in the information processing apparatus 1 and for deleting target data retained in the other storage unit so that the target data is retained in only the one storage unit, and the target data is retrieved from the assigned storage unit by the retrieval unit 52-1 and the retrieved target data is exclusive data which is not retained in the other storage unit but retained in only the one storage unit.

(c) A case in which a memory access request is a store request and target data is retrieved from the assigned storage unit by the retrieval unit 52-1 and the retrieved target data is an exclusive data.

Incidentally, like the cases (b) and (c), in a case in which the memory access request is an exclusive fetch request or a store request, for assuring the coherency of the target data, there is a need to retrieve the target data from all the storage units for deleting or updating the target data. However, in these cases (b) and (c), the target data on the exclusive fetch request or the store request is exclusively preserved with respect to the other storage units and, hence, the retrieval of the target data in the other storage units is omissible.

As described above, in this information processing apparatus 1, in the cases (a) to (c), the local snoop control unit 55-1 can determine an operation to an memory access request so that a memory access control unit, mentioned later, fulfills the memory access request in accordance with the determined operation.

In this connection, in cases other than aforesaid cases (a) to (c), the global snoop control unit 54-1 makes the mutual communication on a retrieval result with respect to the other system controller 50-2, thus determining an operation to the memory access request on the basis of a retrieval result relative to all the storage units provided in the information processing apparatus 1, the type of the memory access request and the registration status of the retrieved target data (that is, whether or not the registration is made in an exclusive manner).

When the local snoop control unit 55-1 controls that retrieval unit 52-1 so that the retrieval unit 52-1 retrieves target data on a memory access request from the assigned storage units and a predetermined condition [aforesaid cases (a) to (c)] including the type of the memory access request, the type of the storage unit from which the target data is retrieved and others reaches satisfaction, the memory access control unit 56-1 fulfills the memory access request.

Moreover, the memory access control unit 56-1 fulfills the memory access request on the basis of the global snoop control unit 54-1 when the global snoop control unit 54-1 determines the operation to the memory access request.

The first canceling unit 57-1 is for canceling the transmission/reception processing on a retrieval instruction in the broadcast transmitting/receiving unit 53-1 under control of the local snoop control unit 55-1. When the local snoop control unit 55-1 makes the retrieval unit 52-1 retrieve the target data on the memory access request, if the target data is retrieved from the assigned storage unit and a predetermined condition reaches realization, it cancels the transmission/reception processing on the retrieval instruction in the broadcast transmitting/receiving unit 53-1.

That is, when the local snoop control unit 55-1 makes the memory access control unit 56-1 fulfill the memory access request, if the broadcast transmitting/receiving unit 53-1 does not carry out the transmission/reception of a retrieval instruction yet, the first canceling unit 57-1 cancels the transmission/reception of the retrieval instruction in the broadcast transmitting/receiving unit 53-1.

Incidentally, the first canceling unit 57-1 also carries out the cancellation with respect to the broadcast transmitting/receiving unit 53-2 of the other system controller 50-2.

The second canceling unit 58-1 is for canceling the processing in the global snoop control unit under control of the local snoop control unit 55-1, and is made to cancel the processing in the global snoop control unit 54-1 in a case in which, when the local snoop control unit 55-1 makes the retrieval unit 52-1 retrieve target data on a memory access request, the target data is retrieved from the assigned storage unit and the predetermined condition [the above-mentioned cases (a) to (c)] is satisfied.

That is, the second canceling unit 58-1 is made to cancel the processing in the global snoop control unit 55-1 in a case in which, when the local snoop control unit 55-1 fulfills a memory access request through the memory access control unit 56-1, the broadcast transmitting/receiving unit 53-1 carries out the transmission/reception of a retrieval instruction.

Moreover, the second canceling unit 58-1 is also designed to cancel the processing in the global snoop control unit 54-2 of the other system controller 50-2.

Furthermore, the system controller 50-2 is composed of a memory access request receiving unit 51-2, a retrieval unit 52-2, a broadcast transmitting/receiving unit 53-2, a global snoop control unit 54-2, a local snoop control unit 55-2, a memory access control unit 56-2, a first canceling unit 57-2 and a second canceling unit 58-2, which are similar to the memory access request receiving unit 51-1, the retrieval unit 52-1, the broadcast transmitting/receiving unit 53-1, the global snoop control unit 54-1, the local snoop control unit 55-1, the memory access control unit 56-1, the first canceling unit 57-1 and the second canceling unit 58-1, respectively, except that the objects of communication control are the primary cache memories 12a, 13a, the secondary cache memories 12b, 13b and the main memories 32, 33.

Secondly, referring to a flow chart (steps S10 to S24) of FIG. 2, a description will be given hereinbelow of a procedure (operation of the information processing apparatus 1) of a local snoop control method in a case in which the CPU 10 issues a memory access request.

Figure 2:
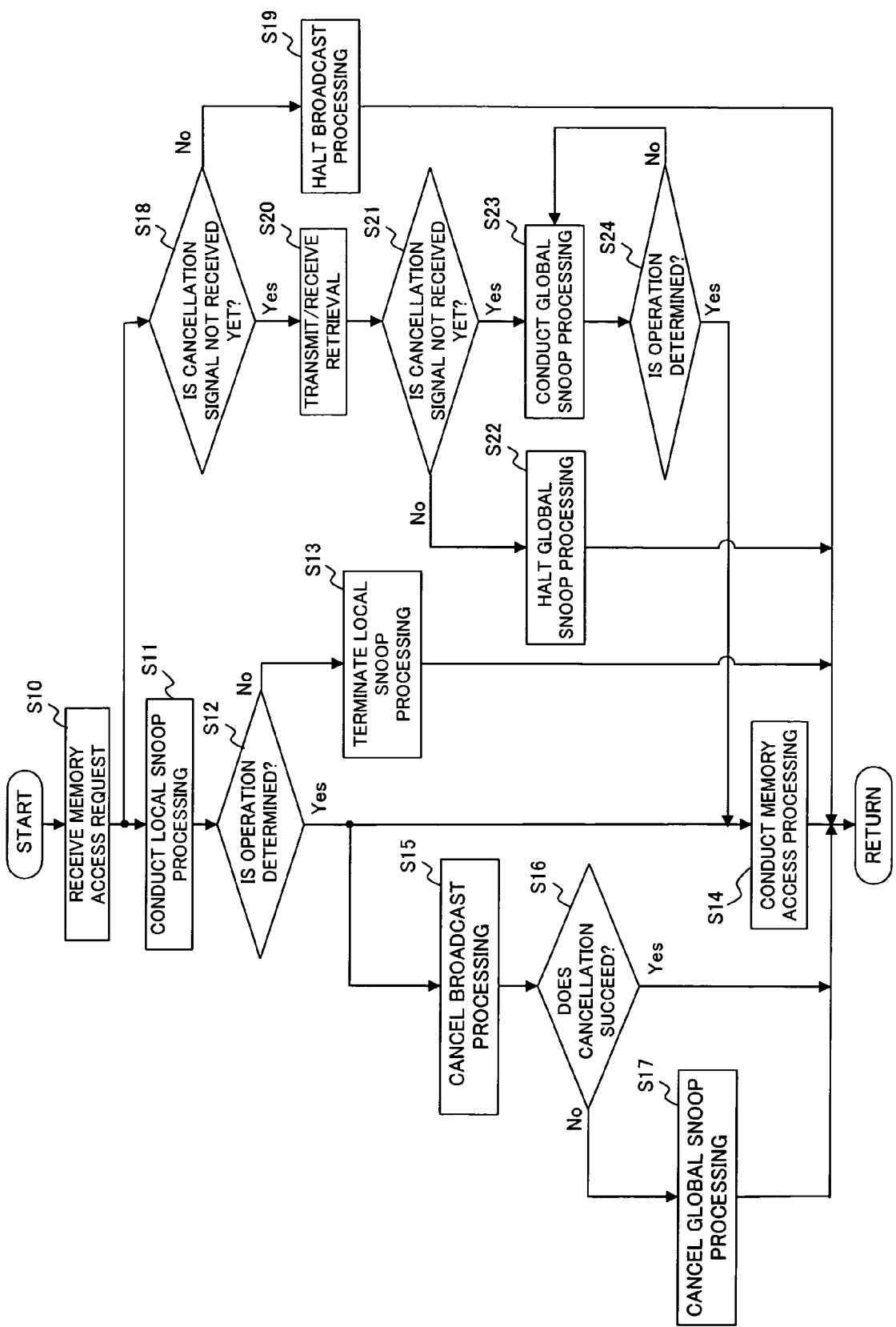
FIG. 2 is a flowchart useful for explaining a procedure of a local snoop control method according to the first embodiment of the present invention.

As FIG. 2 shows, in this information processing apparatus 1, for example, when a memory access request is issued from the CPU 10, the memory access request receiving unit 51-1 of the system controller 50-1 receives this memory access request (step S10).

Moreover, in this information processing apparatus 1, when the memory access request receiving unit 51-1 receives this memory access request, the local snoop control unit 55-1 makes the retrieval unit 52-1 retrieve target data from the storage units (in this case, the primary cache memories 10a, 11a, the secondary cache memories 10b, 11b and the main memories 30, 31), it (that is, the system controller 50-1) takes charge of, in parallel with the transmission/reception processing in the broadcast transmitting/receiving unit 53-1 and the processing in the global snoop control unit 54-1 (step S11; local snoop step).

That is, in this information processing apparatus 1, upon receipt of the memory access request (step S10), simultaneously with the processing (steps S11 to S17) in the local snoop control unit 55-1, the processing (steps S18 to S20) in the broadcast transmitting/receiving unit 53-1 starts.

First, a description will be given of the processing (steps S11 to S17) in the local snoop control unit 55-1. The local snoop control unit 55-1 retrieves target data from the assigned storage units through the use of the retrieval unit 52-1 (step S11) and, on the basis of a result of the retrieval (local snoop) in the retrieval unit 52-1, makes a decision as to whether or not determine an operation for the memory access request (step S12).

At this time, if a decision is made that difficulty is encountered in determining the operation for the memory access request on the basis of the retrieval result in the retrieval unit 52-1 (No route from step S12), the local snoop control unit 55-1 terminates the processing (step S13).

On the other hand, if a decision is made that it is possible to determine the operation for the memory access request on the basis of the retrieval result in the retrieval unit 52-1 [that is, in the above-mentioned cases (a) to (c)] (Yes route from step S12), the local snoop control unit 55-1 carries out the processing on the memory access request through the use of the memory access control unit 56-1 (step S14; memory access request fulfillment step) and conducts the cancellation on the broadcast transmitting/receiving unit 53-1 through the use of the first canceling unit 57-1 for canceling the transmission/reception processing (in this case, the broadcast processing) of a retrieval instruction in the broadcast transmitting/receiving unit 53-1 (step S15; first cancellation step). At this time, the first canceling unit 57-1 also carries out the cancellation on the broadcast transmitting/receiving unit 53-2 of the other system controller 50-2. In this case, it is possible that the first canceling unit 57-1 directly performs the cancellation on the broadcast transmitting/receiving unit 53-2, and it is also acceptable that the first canceling unit 57-2 performs the cancellation thereon.

In addition, when the cancellation of the transmission (broadcast processing) of the retrieval instruction by the first canceling unit 57-1 succeeds with respect to the broadcast transmitting/receiving unit 53-1 (Yes route from step S16), the local snoop control unit 55-1 terminates the processing. The cancellation by the first canceling unit 57-1 reaches success in a case in which the transmission/reception (in this case, the broadcast processing) of a retrieval instruction is not made yet by the broadcast transmitting/receiving unit 53-1, for example, when the retrieval instruction to be transmitted/received by the broadcast transmitting/receiving unit 53-1 is queued for waiting for the implementation of the preceding other retrieval instruction.

On the other hand, if the cancellation by the first canceling unit 57-1 does not succeed because the broadcast transmitting/receiving unit 53-1 carries out the transmission/reception of the retrieval instruction (No route from step S16), the local snoop control unit 55-1 makes the second canceling unit 58-1 carry out the cancellation on the global snoop control unit 54-1 (step S17; second cancellation step), and the processing comes to an end. At this time, the second canceling unit 58-1 also carries out the cancellation on the global snoop control unit 54-2 of the other system controller 50-2. In this case, it is possible that the second canceling unit 58-1 directly performs the cancellation on the global snoop control unit 54-2, and it is also acceptable that the second canceling unit 58-2 performs the cancellation thereon.

Furthermore, a description will be given hereinbelow of the processing (steps S18 to S20) in the broadcast transmitting/receiving unit 53-1 and the processing (steps S21 to S24) which are conducted in parallel with the processing (steps S11 to S17) in the local snoop control unit 55-1 after the reception of the memory access request (step S10).

When the memory access request receiving unit 51-1 receives the memory access request (step S10), the broadcast transmitting/receiving unit 53-1 first makes a decision as to whether or not a signal indicative of the implementation of the cancellation (see the aforesaid step S15) on the transmission/reception of the retrieval instruction is received from the first canceling unit 57-1 (step S18).

Upon receipt of the signal indicative of the implementation of the cancellation from the first canceling unit 57-1 (No route from step S18), the broadcast transmitting/receiving unit 53-1 halts the transmission/reception (in this case, broadcast) of a retrieval instruction for the retrieval of target data on the memory access request (step S19), and the processing comes to an end.

On the other hand, if the broadcast transmitting/receiving unit 53-1 does not receive the signal indicative of the implementation of the cancellation from the first canceling unit 57-1 (Yes route of step S18), with respect to the other broadcast transmitting/receiving unit 53-2, the broadcast transmitting/receiving unit 53-1 makes the transmission/reception (in this case, broadcasts) of a retrieval instruction for the retrieval of the target data on the memory access request from the assigned storage units (step S20).

Moreover, when the transmission/reception of the retrieval instruction between the broadcast transmitting/receiving units 53-1 and 53-2 reaches completion, the processing takes place in the global snoop control unit 54-1. First, the global snoop control unit 54-1 makes a decision as to whether or not the signal indicative of the implementation of the cancellation (see the aforesaid step S17) is received from the second canceling unit 58-1 (step S21).

If the global snoop control unit 54-1 receives the cancellation signal from the second canceling unit 58-1 (No route from step S21), the global snoop control unit 54-1 halts (step S22) and terminates the processing.

On the other hand, if the global snoop control unit 54-1 does not receive the cancellation signal from the second canceling unit 58-1 (Yes route from step S21), the global snoop control unit 54-1 carries out the processing (step S23). That is, it makes the retrieval unit 52-1 conduct the retrieval on the assigned storage units on the basis of the retrieval instruction, transmitted/received by the broadcast transmitting/receiving unit 53-1, in synchronism with the retrieval in the other system controller and performs the communications on the retrieval result in synchronism with the other global snoop control unit 54-2.

In addition, the global snoop control unit 54-1 makes a decision on the processing to the memory access request on the basis of its own retrieval result and the retrieval result received from the other global snoop control unit 54-2 and determines it (step S24). In the case of no determination of the operation to the memory access request (No route from step S24), the operational flow returns to the aforesaid step S23 and again conducts the retrieval processing and others.

On the other hand, in the case of the determination of the operation to the memory access request (Yes route from step S24), the memory access control unit 56-1 carries out the determined processing (step S14).

A more detailed description will be given hereinbelow of a case in which the local snoop control unit 55-1 determines the operation to the memory access request [in the above-mentioned cases (a) to (c); see Yes route from step S12] and the cancellation by the first canceling unit 57-1 reaches success (steps S15 and Yes route from step S16) and a case in which the second canceling unit 58-1 carries out the cancellation (see step S17).

Figure 3:
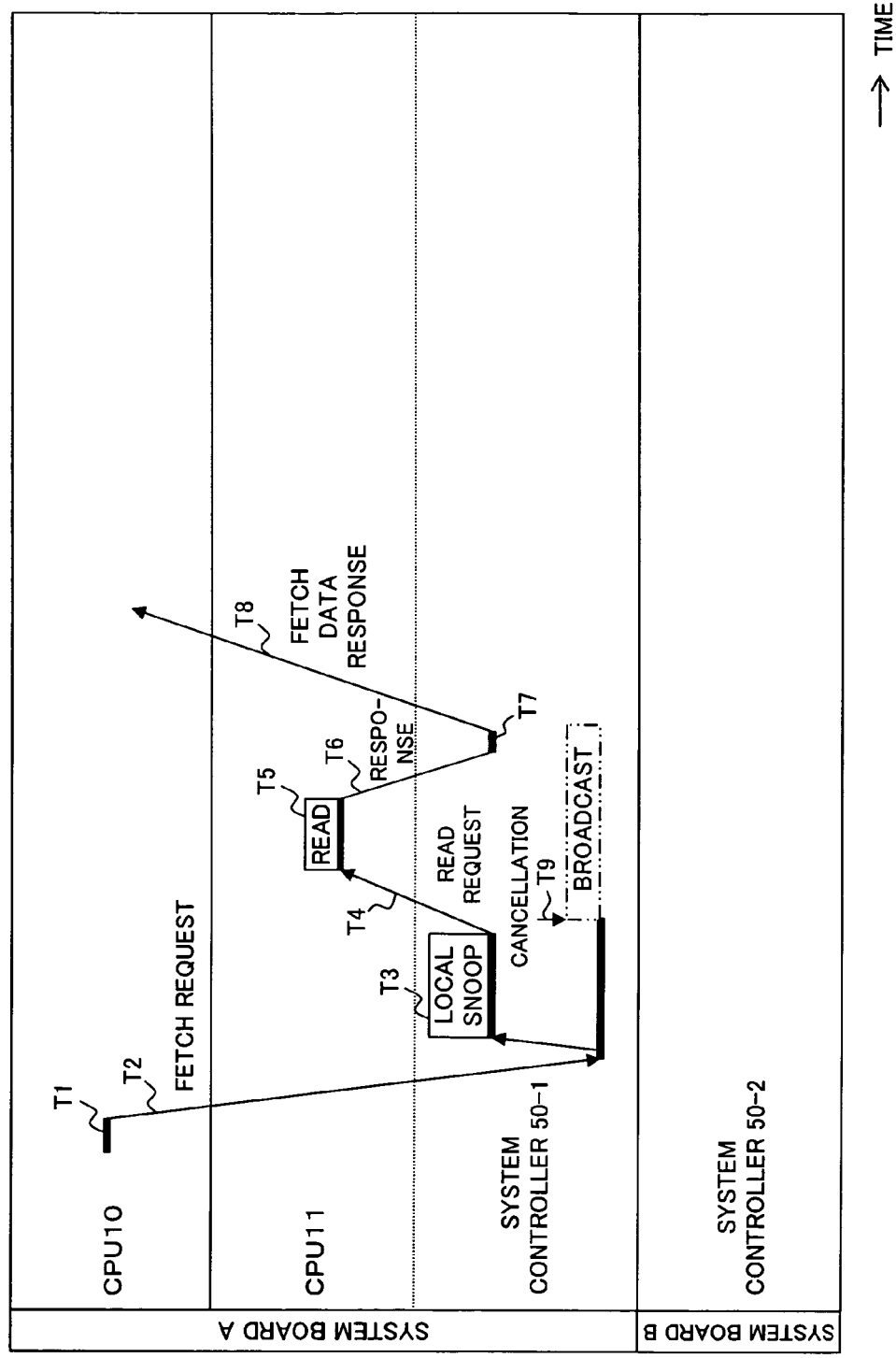
FIG. 3 is a time chart useful for explaining a procedure of cancellation by a first canceling unit in the local snoop control method according to the first embodiment of the present invention.

FIG. 3 is a flow chart showing a procedure to be conducted in a case in which the first canceling unit 57-1 carries out the cancellation in the local snoop control method according to the first embodiment of the present invention. As shown in FIG. 3, when a memory access request (in this case, a fetch request) occurs in the CPU 10 (see T1) and the memory access request receiving unit 51-1 of the system controller 50-1 receives this fetch request (see T2), the local snoop control unit 55-1 carries out a retrieval (local snoop) through the use of the retrieval unit 52-1 (see T3).

Moreover, when the retrieval unit 52-1 retrieves target data on the fetch request (in this case, let it be assumed that it is retrieved from the primary cache memory 11a of the CPU 11) and a predetermined condition reaches realization [the aforesaid case (a) or (b)], the local snoop control unit 55-1 determines an operation to the fetch request (see Yes route from step S12 in FIG. 2).

When the local snoop control unit 55-1 determines the processing for the fetch request, for the fulfillment of this fetch request, the memory access control unit 56-1 issues a read request for the target data on the fetch request to the primary cache memory 11a of the CPU 11 (see T4) and, after the readout of the target data on the fetch request from the primary cache memory 11a into the system controller 50-1 (see T5 and T6), the memory access control unit 56-1 transmits, as a fetch data response, the target data read out from the primary cache memory 11a to the CPU 10, and the fulfillment of the fetch request reaches completion (see T7 and T8).

In addition, when the local snoop control unit 55-1 determines the operation to the fetch request, the first canceling unit 57-1 cancels the processing in the broadcast transmitting/receiving unit 53-1 (see T9; see step S13 in FIG. 2). Still additionally, when the transmission/reception of the retrieval instruction is not made yet in the broadcast transmitting/receiving unit 53-1 and the broadcast transmitting/receiving unit 53-1 receives the cancellation signal (No route from step S18 in FIG. 2), the broadcast transmitting/receiving unit 53-1 stops the retrieval instruction transmission/reception processing (see step S19 in FIG. 2).

Figure 4:
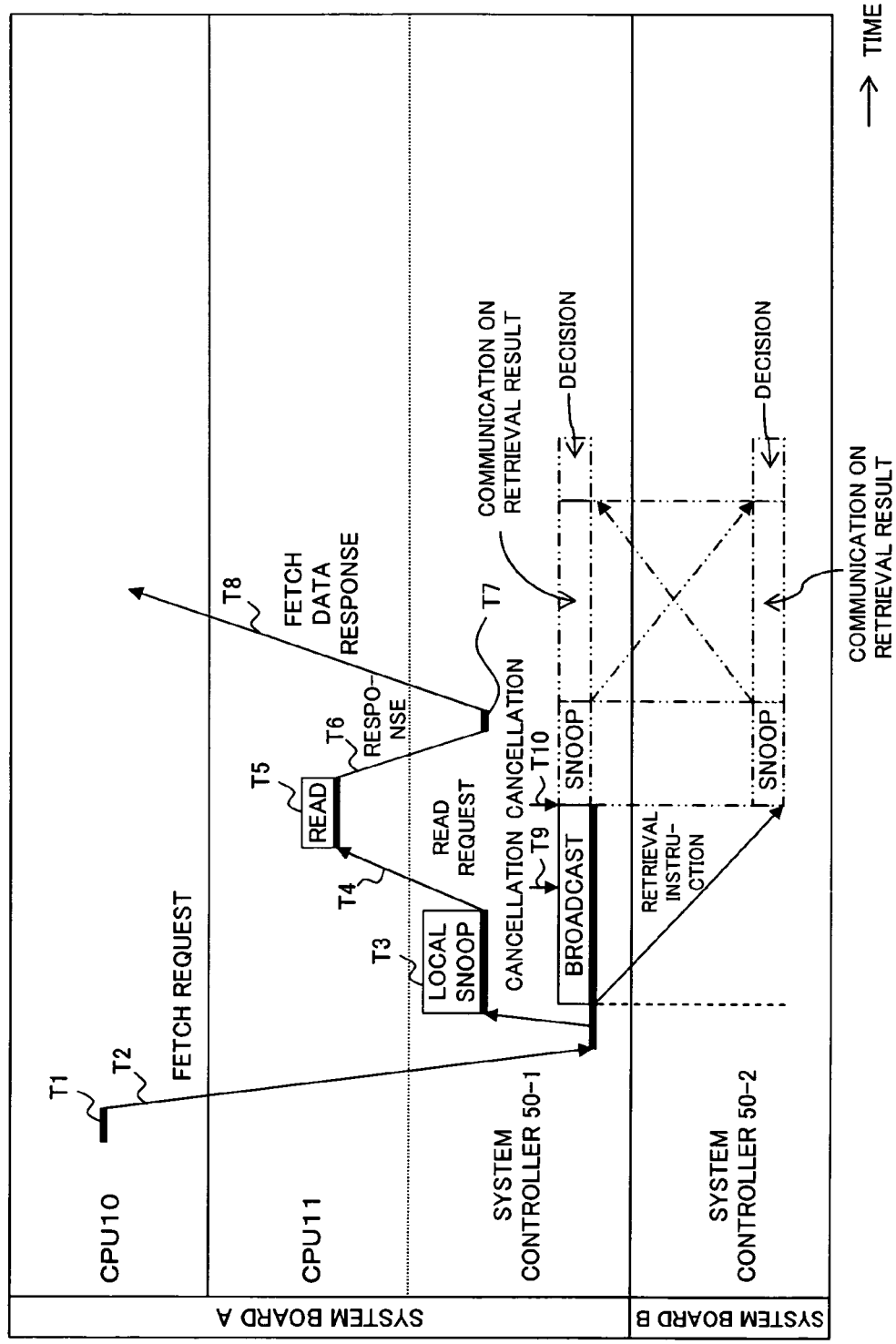
FIG. 4 is a time chart useful for explaining a procedure of cancellation by a second canceling unit in the local snoop control method according to the first embodiment of the present invention.

FIG. 4 is a time chart showing a procedure in a case in which the second canceling unit 58-1 carries out the cancellation in the local snoop control method according to the first embodiment of the present invention [in the aforesaid case (a) or (b)]. In FIG. 4, the same reference numerals as those used above designate the same or almost same parts, and the detailed description thereof will be omitted for brevity.

As shown in FIG. 4, the local snoop control unit 55-1 determines and conducts an operation with respect to a fetch request issued from the CPU 10 (see T1 to T8). Moreover, the local snoop control unit 55-1 makes the first canceling unit 56-1 carry out the cancellation on the broadcast transmitting/receiving unit 53-1 (see T9). If the transmission/reception of the retrieval instruction is already made by the broadcast transmitting/receiving unit 53-1 so that the cancellation by the first canceling unit 56-1 does not succeed (see No route from step S16 and Yes route from step S18 in FIG. 2), the local snoop control unit 55-1 makes the second canceling unit 58-1 cancel the processing in the global snoop control unit 54-1 after the completion of the processing of the transmission/reception (broadcast) in the broadcast transmitting/receiving unit 53-1 (see T10; see step S17 in FIG. 2).

Moreover, when the global snoop control unit 54-1 receives a signal indicative of the cancellation from the second canceling unit 58-1 (see No route from step S21 in FIG. 2), the global snoop control unit 54-1 halts this processing (see step S22 in FIG. 2).

Although, referring to FIGS. 2 to 4, the operation in the system controller 50-1 has mainly been described above in the case of the issue of a memory access request from the CPU 10 as an example of the local snoop control method (operation of the information processing apparatus 1) according to the first embodiment of the present invention, the operation in the system controller 50-2 to be conducted in a case in which a memory access request is issued from the CPUs 12, 13 or the I/O units 22, 23, the system controller 50-2 takes charge of, is similar to the operation in the system controller 50-1 described with reference to FIGS. 2 to 4.

As described above, with the information processing apparatus 1 and the local snoop control unit according to the first embodiment of the present invention, when the system controller 50-1, 50-2 receive a memory access request, issued from one of the CPUs 10 to 13 or the I/O units 20 to 23, they take charge of in communication control, through their own memory access request receiving units 51-1 and 51-2, the local snoop control units 55-1 and 55-2 retrieve the target data on the memory access request from the assigned storage unit (conduct the local snoop step) in parallel with the transmission/reception processing on a retrieval instruction in the broadcast transmitting/receiving units 53-1, 53-2 and the processing in the global snoop control units 54-1, 54-2. When as the retrieval result the target data on the memory access request is retrieved from the assigned storage unit and a predetermined condition reaches realization [the above-mentioned cases (a) to (c)], an operation to the memory access request is determined so that the memory access control units 56-1 and 56-2 fulfill the memory access request. This enables the memory access request to be fulfilled at a high speed.

That is, as the results of the local snoop processing in the local snoop control units 55-1 and 55-2, if the local snoop control units 55-1 and 55-2 can determine the processing for the memory access request, the memory access control units 56-1 and 56-2 fulfill the memory access request regardless of the processing in the broadcast transmitting/receiving units 53-1, 53-2 and in the global snoop control units 54-1, 54-2, which considerably shortening the time needed from which the memory access request occurs until the memory access request is fulfilled.

In addition, when the local snoop control units 55-1 and 55-2 determine an operation to the memory access request, the first canceling units 57-1 and 57-2 cancel the transmission/reception processing on a retrieval instruction in the broadcast transmitting/receiving units 53-1 and 53-2, or the second canceling units 58-1 and 58-2 cancel the processing in the global snoop control units 54-1 and 54-2. This can suppress the implementation of the unnecessary processing owing to the fulfillment of the memory access request by the local snoop control units 55-1 and 55-2 and can suppress an increase in usage rate of a bus between the system controllers 50-1 and 50-2 which arises due to the implementation of the processing in the broadcast transmitting/receiving units 53-1, 53-2 and in the global snoop control units 54-1, 54-2, thus reducing the usage rate of the bus between the system controllers 50-1 and 50-2 to realize the efficient use of the bus therebetween.

[2] Second Embodiment of the Present Invention

Furthermore, a description will be given hereinbelow of an information processing apparatus and a local snoop control method according to a second embodiment of the present invention.

Figure 5:
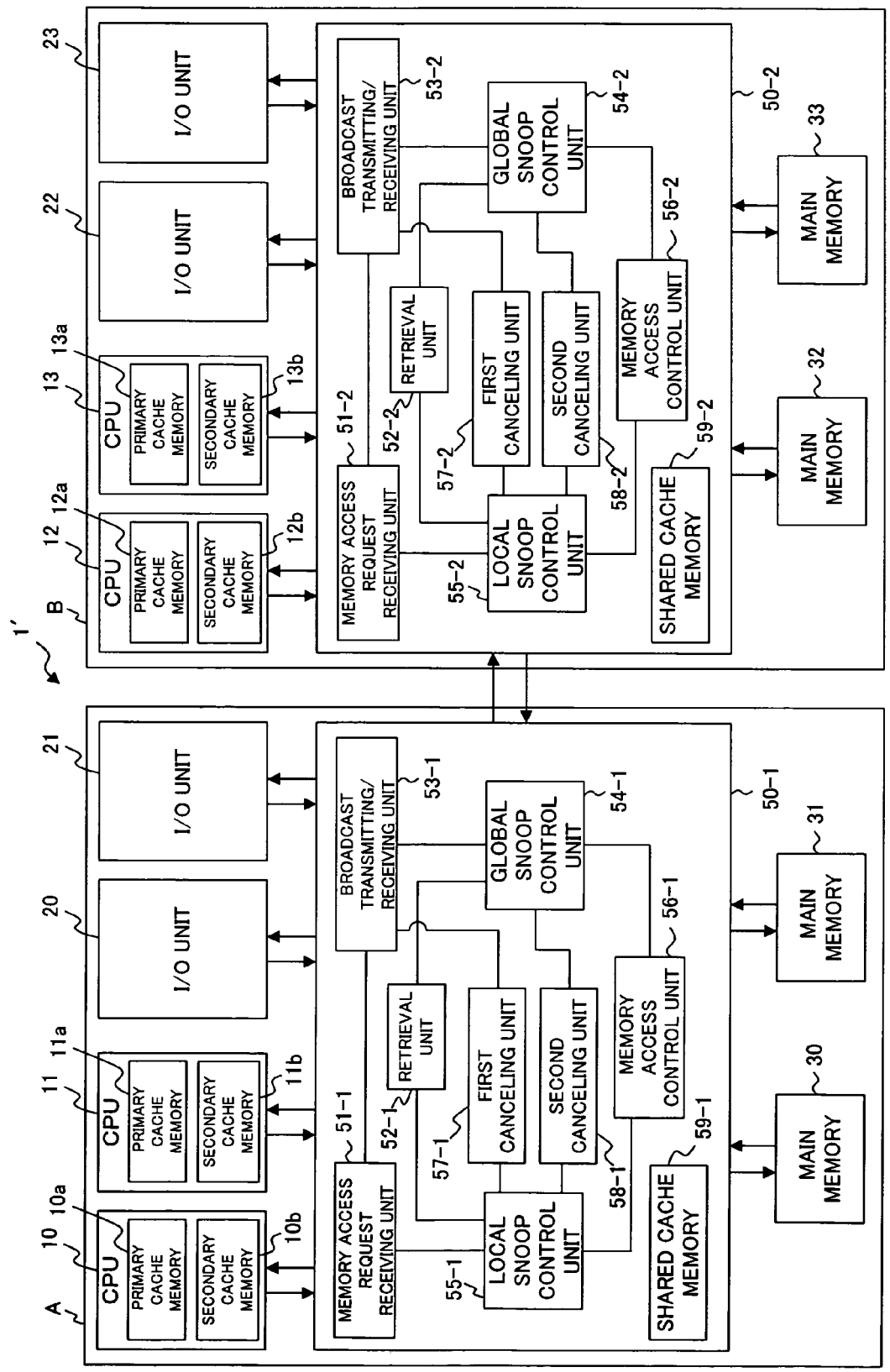
FIG. 5 is a block diagram showing a configuration of an information processing apparatus according to a second embodiment of the present invention.
Figure 6:
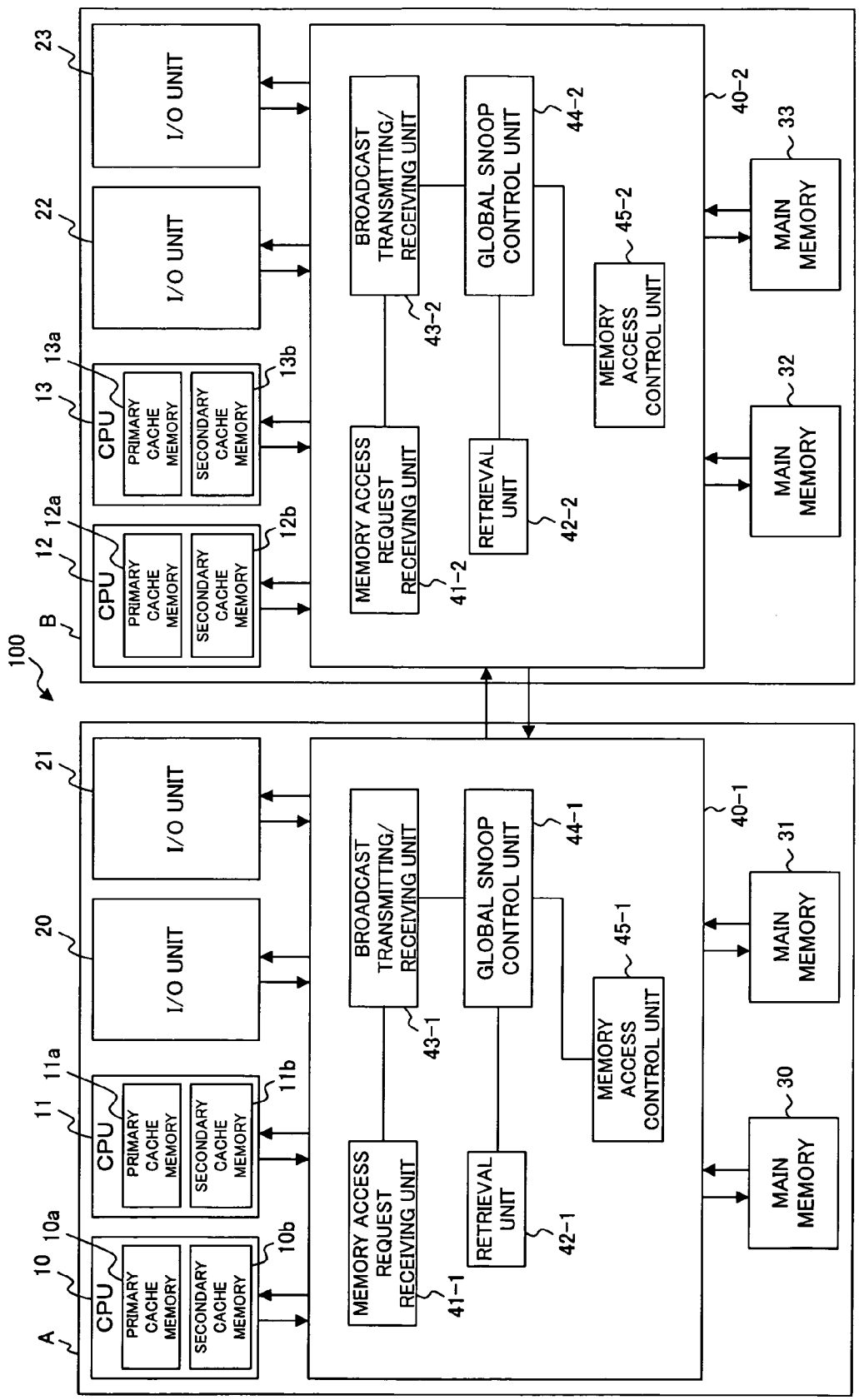
FIG. 6 is a block diagram showing a configuration of a conventional large-scale information processing apparatus.
Figure 7:
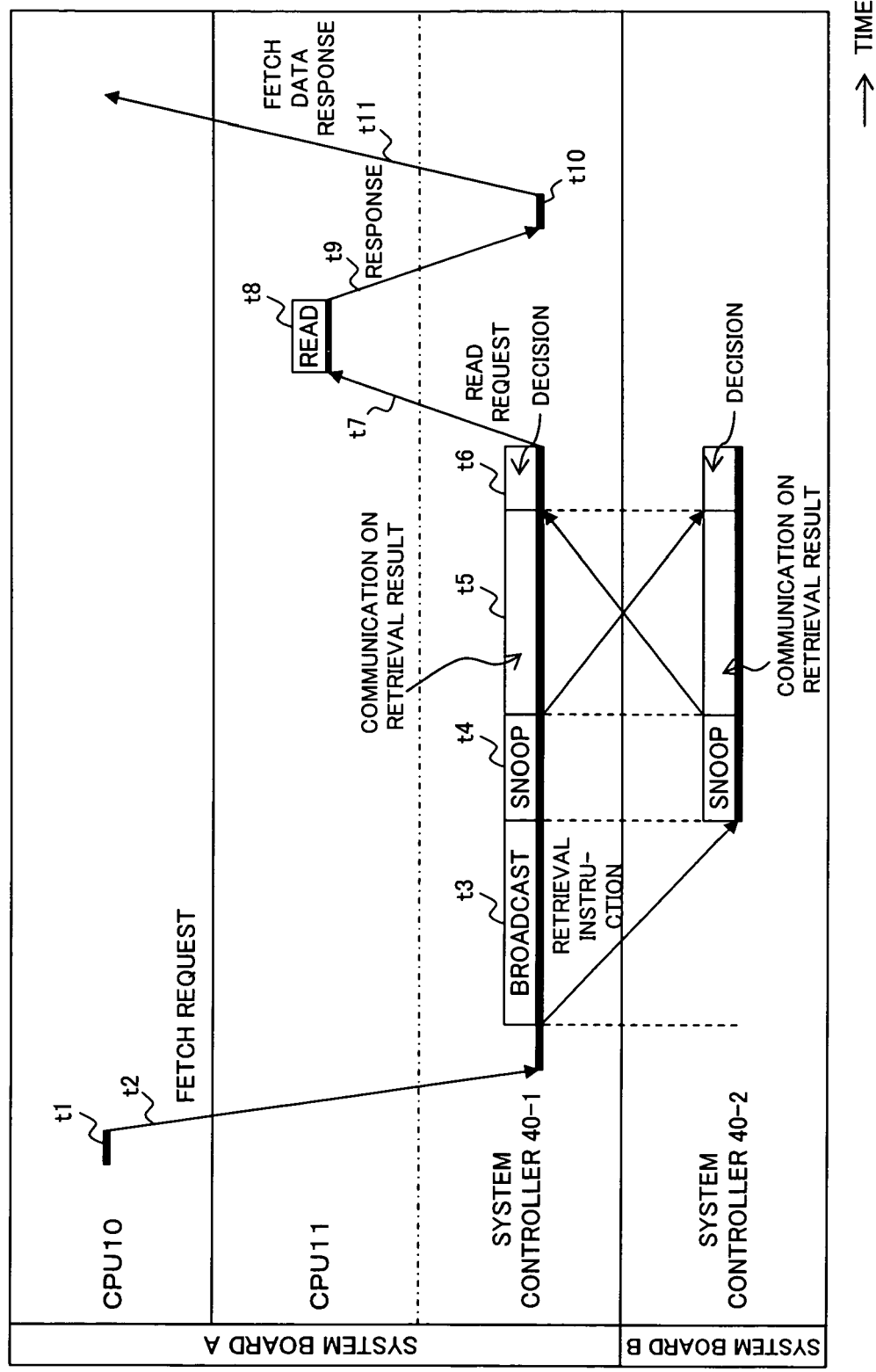
FIG. 7 is a time chart for explaining an operation of the conventional large-scale information processing apparatus.
Figure 8:
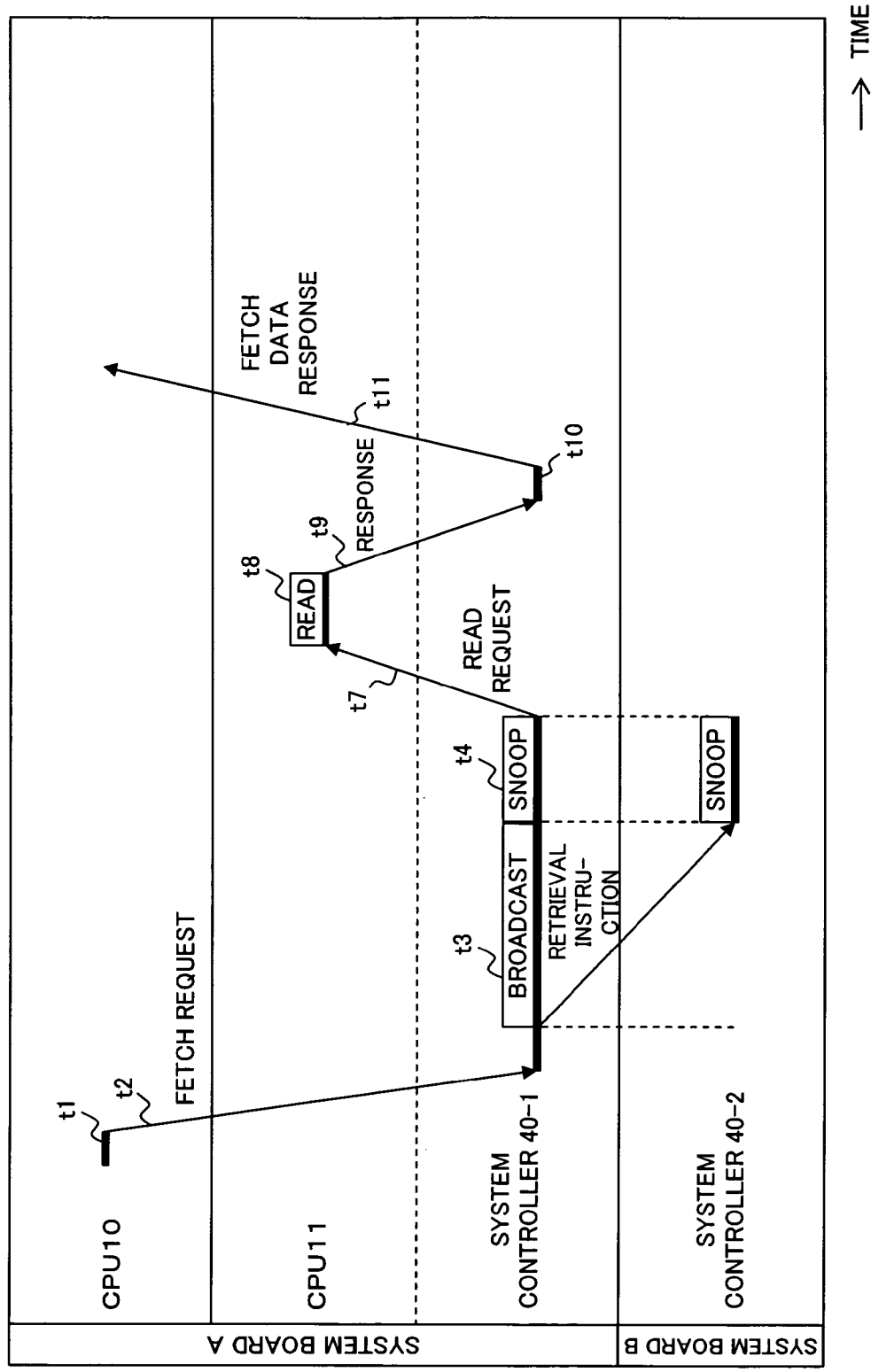
FIG. 8 is a time chart for explaining an operation to be conducted in the conventional large-scale information processing apparatus in a case in which communication processing on a retrieval result is not conducted between a plurality of system controllers.

FIG. 5 is a block diagram showing a configuration of an information processing apparatus 1' according to a second embodiment of the present invention. In FIG. 5, the same reference numerals as those used above designate the same or almost same parts, and the description thereof will be omitted for simplicity.

As FIG. 5 shows, the information processing apparatus 1' according to the second embodiment of the present invention is similar to the information processing apparatus according to the first embodiment, described above with reference to FIG. 1, except that system controllers 50-1 and 50-2 are equipped with shared cache memories (shared storage units) 59-1 and 59-2.

The shared cache memory 59-1 is for exclusively retaining data with respect to the other storage units (in this case, primary cache memories 10a to 13a, secondary cache memories 10b to 13b, main memories 30 to 33, and a shared cache memory 59-2 which will be mentioned later) provided in the information processing apparatus 1'. That is, the data to be retained in the shared cache memory 59-1 is not retained in the other storage units.

Moreover, the shared cache memory 59-1 functions as one of cache memories arranged hierarchically in CPUs 10 and 11 and, in this case, functions as a tertiary cache memory of each of the CPUs 10 and 11.

Likewise, the shared cache memory 59-2 is for exclusively retaining data with respect to the other storage units (in this case, the primary cache memories 10a to 13a, the secondary cache memories 10b to 13b, the main memories 30 to 33, and the shared cache memory 59-1) provided in the information processing apparatus 1'.

In addition, the shared cache memory 59-2 functions as one of cache memories arranged hierarchically in CPUs 12 and 13 and, in this case, functions as a tertiary cache memory of each of the CPUs 12 and 13.

In this information processing apparatus 1', objects of the retrieval by a retrieval unit 52-1 are the primary cache memories 10a, 11a, the secondary cache memories 10b, 11b, the main memories 30, 31 and the shared cache memory 59-1, while objects of the retrieval by a retrieval unit 52-2 are the primary cache memories 12a, 13a, the secondary cache memories 12b, 13b, the main memories 32, 33 and the shared cache memory 59-2.

Therefore, in the information processing apparatus 1' according to the second embodiment of the present invention, in a case in which the retrieval unit 52-1 retrieves target data on a memory access request from the assigned storage unit and in the above-mentioned cases (a) to (c) or in a case in which the target data is retrieved from the shared cache memory 59-1 irrespective of the type of the memory access request, a local snoop control unit 55-1 can determine an operation to the memory access request.

Moreover, in a case in which the retrieval unit 52-2 retrieves target data on a memory access request from the shared cache memory 59-2, local snoop control unit 55-2 can also determine an operation to the memory access request.

A local snoop control method according to the second embodiment of the present invention is similar to the local snoop control method according to the first embodiment described above with reference to FIGS. 2 to 4 except that, as mentioned above, each of the local snoop control unit 55-1, 55-2 determines an operation to a memory access request also in a case in which the retrieval unit 52-1, 52-2 retrieves target data on the memory access request from the shared cache memory 59-1, 59-2 so that memory access control unit 56-1, 56-2 fulfills the memory access request.

Thus, the information processing unit 1' and the local snoop control method according to the second embodiment of the present invention can provide the effects similar to those of the above-described first embodiment, and owing to the employment of the shared cache memories 59-1 and 59-2, the local snoop control units 55-1 and 55-2 fulfill the memory access request also if the retrieval result by the local snoop control units 55-1 and 55-2 shows that the target data on a memory access request is preserved in the shared cache memories 59-1 and 59-2, which increases the chance of processing the memory access request at a high speed without conducting the processing in the broadcast transmitting/receiving units 53-1, 53-2 or the global snoop control units 54-1, 54-2, thereby more reliably shortening the time to be taken until the fulfillment of the memory access request after the occurrence of a memory access request.

[3] Modification of the Present Invention

It should be understood that the present invention is not limited to the above-described embodiments, and that it is intended to cover all changes and modifications of the embodiments of the invention herein which do not constitute departures from the spirit and scope of the invention.

For example, although in the above-described embodiments the cancellation is first made with respect to the retrieval (snoop) in the retrieval units 52-1 and 52-2 by the global snoop control units 54-1 and 54-2 in a case in which the second canceling units 58-1 and 58-2 cancel the processing in the global snoop control units 54-1 and 54-2, the present invention is not limited to this. That is, it is also appropriate that the second canceling unit 58-1, 58-2 cancels the communication processing on the retrieval result by the global snoop control unit 54-1, 54-2 after the completion of the retrieval by the retrieval unit 52-1, 52-2, i.e., after the check of the retrieval result.

In addition, it is also appropriate that, depending upon the timing at which the cancellation by the second canceling units 58-1 and 58-2 becomes executable, the communication processing on the retrieval result in the global snoop control units 54-1 and 54-2 is canceled halfway.

Still additionally, although in the above-described embodiments the information processing apparatus 1, 1' is equipped with two system controllers, the present invention is not limited to this. it is also appropriate that the information processing apparatus 1, 1' is equipped with more-than-two system controllers. In this case, the system controllers can be connected to cross over a plurality of bodies of equipment, or an LSI is additionally used for the communication control between the system controllers.

Although in the above-described embodiments the first canceling units 57-1, 57-2, the second canceling units 58-1, 58-2 and the local snoop control units 55-1, 55-2 are separately provided in the system controllers 50-1 and 50-2, the present invention is not limited thereto. It is also appropriate that the local snoop control unit 55-1 has the functions as the first canceling unit 57-1 and the second canceling unit 58-1 while the local snoop control unit 55-2 has the functions as the first canceling unit 57-2 and the second canceling unit 58-2.

In the above-described embodiments, it is also appropriate that each of the I/O units 20 to 23 includes a storage unit and the retrieval units 52-1 and 52-2 carry out the retrieval on the storage units provided in the I/O units 20 to 23.

[4] Others

The functions of the above-described memory access request receiving units 51-1, 51-2, retrieval units 52-1, 52-2, broadcast transmitting/receiving units 53-1, 53-2, global snoop control units 54-1, 54-2, local snoop control units 55-1, 55-2, memory access control units 56-1, 56-2, first canceling units 57-1, 57-2 and second canceling units 58-1, 58-2 are realizable in a manner such that a predetermined application program (local snoop control program) is executed by a computer (including a CPU, an information processing unit and various terminals).

This program is brought in a state recorded in a computer-readable recording medium such as flexible disk, CD-ROM, CD-R, CD-RW or DVD. In this case, for use, the computer reads out the local snoop control program from this recording medium and transfers it to an internal storage unit or an external storage unit for storing therein. Moreover, it is also appropriate that this program is first recorded in a storage unit (recording medium) such as magnetic disk, optical disk or magneto optical disk and then brought from the storage unit through a communication line to a computer.

In this case, the computer depicts the concept including hardware and OS (Operating System) and signifies hardware operated under control of OS. Moreover, in a case in which the OS is unnecessary and an application operates the hardware by itself, the hardware itself corresponds to the computer. The hardware is provided with at least a microprocessor such as CPU and a means for reading out a computer program recorded in a recording medium. The application program serving as the aforesaid local snoop control program includes program codes for making the computer realize the above-described functions of the memory access request receiving units 51-1, 51-2, the retrieval units 52-1, 52-2, the broadcast transmitting/receiving units 53-1, 53-2, the global snoop control units 54-1, 54-2, the local snoop control units 55-1, 55-2, the memory access control units 56-1, 56-2, the first canceling units 57-1, 57-2 and the second canceling units 58-1, 58-2. Moreover, it is also acceptable that a portion of these functions is realized with OS in place of the application program.

Furthermore, as the recording medium in this embodiment, in addition to the aforesaid flexible disk, CD-ROM, CD-R, CD-RW, DVD, magnetic disk, optical disk and magneto optical disk, it is also possible to employ an IC card, a ROM cartridge, a magnetic tape, a punch card, an internal storage unit (memory such as RAM or ROM) in a computer, an external storage unit and others, and further to employ various computer-readable mediums such as printed matter having printed codes, including bar codes.

What is claimed is:

1. An information processing apparatus, comprising:
   a plurality of storage units;
   a plurality of hosts each of which issues, to one of said plurality of storage units, a memory access request; and
   a plurality of system controllers each of which is exclusively connected to at least one of said plurality of storage units and one of said plurality of hosts, each of said plurality of system controllers including:
   a memory access request receiving unit for receiving the memory access request from the host connected to each said system controller;
   a broadcast transmitting/receiving unit for, when said memory access request receiving unit receives said memory access, sending a retrieval instruction for retrieval of target data of said memory access request in said plurality of storage units to said broadcast transmitting/receiving units of the remaining system controllers, and for, when said memory access request receiving unit does not receive the memory access, receiving said memory access request sent from another one of the remaining system controllers;
   a global snoop control unit for retrieving said target data of said memory access request from said storage unit connected to each said system controller in synchronization with global snoop control units of the remaining system controllers in accordance with said retrieval instruction transmitted/received by said broadcast transmitting/receiving unit to make communication on a result of the retrieval between said plurality of system controllers;
   a local snoop control unit for, when said memory access request receiving unit of each said system controller receives said memory access request, retrieving said target data of said memory access request from said storage unit connected to each said system controller in parallel with transmission of said retrieval instruction by said broadcast transmitting/receiving unit of each said system controller or processing in said global snoop control unit of each said system controller; and
   a memory access control unit for fulfilling said memory access request using said target data retrieved by said local snoop control unit, when said target data of said memory access request is retrieved from said storage unit connected to each said system controller by said local snoop control unit and a predetermined condition related to a type of said memory access request and/or a type of said target data reaches satisfaction;
   a first canceling unit for, when the timing of fulfilling said memory access request by said memory access control unit is before said broadcast transmitting/receiving unit carries out transmission/reception of said retrieval instruction, canceling said transmission/reception processing on said retrieval instruction in said broadcast transmitting/receiving unit in the system controller to which said memory access control unit, which fulfills said memory access request, belongs; and a second canceling unit for, when the timing of fulfilling said memory access request by said memory access control unit is after said broadcast transmitting/receiving unit carries out said transmission/reception processing on said retrieval instruction, canceling all the processing in the global snoop control units performed in a synchronized state between said plurality of system controllers.

2. The information processing apparatus according to claim 1, wherein said global snoop control unit makes mutual communication on a result of the retrieval for said target data of said memory access request, based on said retrieval instruction, in a state synchronized between said plurality of system controllers, and determines an operation to said memory access request on the basis of results of the retrieval in said system controllers.

3. The information processing apparatus according to claim 1, wherein said predetermined condition signifies that said memory access request is a shared fetch instruction.

4. The information processing apparatus according to claim 1, wherein said predetermined condition signifies that said memory access request is an exclusive fetch instruction and said target data retrieved by said local snoop control unit is exclusive data.

5. The information processing apparatus according to claim 1, wherein said predetermined condition signifies that said memory access request is a store instruction and said target data retrieved by said local snoop control unit is exclusive data.

6. The information processing apparatus according to claim 1, wherein said plurality of system controllers have, as one of said plurality of storage units, a shared storage unit made to retain data exclusively with respect to the other storage units, and said predetermined condition signifies that said storage unit which retains said target data retrieved by said local snoop control unit is said shared storage unit.

7. The information processing apparatus according to claim 1, further comprising one or more arithmetic units so that said plurality of storage units include one or more storage units provided in said arithmetic units.

8. The information processing apparatus according to claim 1, further comprising one or more input/output units so that said plurality of storage units include one or more storage units provided in said input/output units.

9. A system controller in an information processing apparatus where a plurality of hosts each of which issues, to one of a plurality of storage units, a memory access request, comprising:

the system controller exclusively connected to at least one of said plurality of storage units and one of said plurality of hosts;

a memory access request receiving unit for receiving the memory access request issued from the host connected to the system controller;

a broadcast transmitting/receiving unit for, when said memory access request receiving unit receives said memory access, sending a retrieval instruction for retrieval of target data of said memory access request in said plurality of storage units to said broadcast transmitting/receiving units of remaining system controllers, and for, when said memory access request receiving unit does not receive memory access, receiving said memory access request sent from another of the remaining system controllers;

a global snoop control unit for retrieving said target data of said memory access request from said storage unit connected to each system controller in synchronization with global snoop control units of remaining system controllers, assigned thereto, in accordance with said retrieval instruction transmitted/received by said broadcast transmitting/receiving unit to make mutual communication on a result of the retrieval with respect to the other system controllers;

a local snoop control unit for, when said memory access request receiving unit of each said system controller receives said memory access request, retrieving said target data of said memory access request from said storage unit connected to each said system controller, assigned thereto, in parallel transmission of said retrieval instruction by said broadcast transmitting/receiving unit of each said system controller or processing in said global snoop control unit of each said system controller;

a memory access control unit for fulfilling said memory access request using said target data retrieved by said local snoop control unit, when said target data of said memory access request is retrieved from said storage unit, assigned thereto, by said local snoop control unit and a predetermined condition related to a type of said memory access request and/or a type of said target data reaches satisfaction;

a first canceling unit for, when the timing of fulfilling said memory access request by said memory access control unit is before said broadcast transmitting/receiving unit carries out transmission/reception of said retrieval instruction, canceling said transmission/reception processing on said retrieval instruction in said broadcast transmitting/receiving unit in the system controller to which said memory access control unit, which fulfills said memory access request, belongs; and a second canceling unit for, when the timing of fulfilling said memory access request by said memory access control unit is after said broadcast transmitting/receiving unit carries out said transmission/reception processing on said retrieval instruction, canceling all the processing in the global snoop control units performed in a synchronized state between said plurality of system controllers.

10. The system controller according to claim 9, wherein said predetermined condition signifies that said memory access request is a shared fetch instruction.

11. The system controller according to claim 9, wherein said predetermined condition signifies that said memory access request is an exclusive fetch instruction and said target data retrieved by said local snoop control unit is exclusive data.

12. The system controller according to claim 9, wherein said predetermined condition signifies that said memory access request is a store instruction and said target data retrieved by said local snoop control unit is exclusive data.

13. The system controller according to claim 9, wherein a shared storage unit made to retain data exclusively with respect to the other storage units is provided as one of said plurality of storage units, and said predetermined condition signifies that said storage unit which retains said target data retrieved by said local snoop control unit is said shared storage unit.

14. A local snoop control method for use in an information processing apparatus including a plurality of storage units and a plurality of system controllers connected to each other to be communicable with each other and made to share communication control on said plurality of storage units, each of said plurality of system controllers being made to conduct global snoop processing in which, when a memory access request occurs, for retrieving target data of said memory access request from all said plurality of storage units managed by each system controller in synchronization with the global snoop control units of remaining system controllers, transmission/reception processing on a retrieval instruction for the retrieval of said target data of said memory access request is conducted between said plurality of system controllers so that said target data of said memory access request is retrieved from said storage unit managed by said system controller in accordance with the transmitted/received retrieval instruction to communicate a result of the retrieval mutually between said plurality of system controllers, said local snoop control method comprising:

a local snoop step of, when said system controller receives said memory access request issued from a unit connected to each said system controller, retrieving said target data of said memory access request from said storage unit managed by each said system controller in parallel with the retrieval instruction transmission/reception processing or the global snoop processing;

a memory access request fulfillment step of fulfilling said memory access request when said target data of said memory access request is retrieved from said storage unit managed by said system controller in said local snoop step and a predetermined condition reaches satisfaction;

a first canceling step for, when the timing of fulfilling said memory access request is before transmission/reception on said retrieval instruction is made at implementation of said memory access request fulfillment step, canceling said transmission/reception processing on said retrieval instruction in the system controller to which fulfills said memory access request, belongs; and a second canceling step for, when the timing of fulfilling said memory access request is after transmission/reception on said retrieval instruction is made at implementation of said memory access request fulfillment step, canceling all said global snoop processing in a synchronized state between said plurality of system controllers.

15. The local snoop control method according to claim 14, wherein said predetermined condition signifies that said memory access request is a shared fetch instruction.

16. The local snoop control method according to claim 14, wherein said predetermined condition signifies that said memory access request is an exclusive fetch instruction and said target data retrieved in said local snoop control step is exclusive data.

17. The local snoop control method according to claim 14, wherein said predetermined condition signifies that said memory access request is a store instruction and said target data retrieved in said local snoop control step is exclusive data.

18. The local snoop control method according to claim 14, wherein said plurality of system controllers have, as one of said plurality of storage units, a shared storage unit made to retain data exclusively with respect to the other storage units, and said predetermined condition signifies that said storage unit which retains said target data retrieved in said local snoop control step is said shared storage unit.

19. A computer-readable recording medium having a local snoop control program for making a computer realize a function as a system controller exclusively connected to at least one of a plurality of storage units and one of a plurality of hosts provided in an information processing apparatus, said plurality of hosts each of which issues, to one of said plurality of storage units, a memory access request, said local snoop control program making said computer function as:

a memory access request receiving unit for receiving the memory access request issued from the host connected to each said system controller;

a broadcast transmitting/receiving unit for, when said memory access request receiving unit receives said memory access, sending a retrieval instruction for retrieval of target data of said memory access request in said plurality of storage units to said broadcast transmitting/receiving units of the remaining system controllers, and for, when said memory access request receiving unit does not receive the memory access, receiving said memory access request sent from another one of the remaining system controllers;

a global snoop control unit for retrieving said target data of said memory access request from said storage unit connected to each said system controller in synchronization with the global snoop control units of the remaining system controllers in accordance with said retrieval instruction transmitted/received by said broadcast transmitting/receiving unit to make mutual communication on a result of the retrieval with respect to the other system controllers;

a local snoop control unit for, when said memory access request receiving unit of each said system controller receives said memory access request, retrieving said target data of said memory access request from said storage unit connected to each said system controller in parallel with transmission of said retrieval instruction by said broadcast transmitting/receiving unit of each said system controller or processing in said global snoop control unit of each said system controller;

a memory access control unit for fulfilling said memory access request using said target data retrieved by said local snoop control unit, when said target data of said memory access request is retrieved from said storage unit connected to each said system controller by said local snoop control unit and a predetermined condition related to a type of said memory access request and/or a type of said target data reaches satisfaction;

a first canceling unit for, when the timing of fulfilling said memory access request by said memory access control unit is before said broadcast transmitting/receiving unit carries out transmission/reception of said retrieval instruction, canceling said transmission/reception processing on said retrieval instruction in said broadcast transmitting/receiving unit in the system controller to which said memory access control unit, which fulfills said memory access request, belongs; and a second canceling unit for, when the timing of fulfilling said memory access request by said memory access control unit is after said broadcast transmitting/receiving unit carries out said transmission/reception processing on said retrieval instruction, canceling all the processing in the global snoop control units performed in a synchronized state between said plurality of system controllers.

20. A method, comprising:

retrieving, at a local snoop unit in a system controller, target data from a storage unit responsive to a memory access request at a same time as retrieval instructions are being processed by a broadcasting unit in the system controller or by a global snoop unit in the system controller;

fulfilling, at a memory control unit, the memory access request using the target data retrieved by the local snoop unit when the target data is retrieved by the local snoop unit and a predetermined condition corresponding to a type of the memory access request is satisfied; and cancelling the processing by the broadcasting unit if the target data is retrieved by the local snoop unit before the retrieval instructions are processed by the broadcasting unit and cancelling the processing by the global snoop unit and all other global snoop units in other system controllers in communication with the system controller synchronously if the target data is retrieved by the local snoop unit after the retrieval instructions are processed by the broadcasting unit.

* * * * *